J. BALLY.
ELECTRIC FURNACE.
APPLICATION FILED JULY 5, 1912.

1,068,558.

Patented July 29, 1913.
5 SHEETS—SHEET 1.

WITNESSES:
John C. Sanders
Albert F. Heyman

INVENTOR:
Jean Bally
BY Thu Wallace White
ATTY

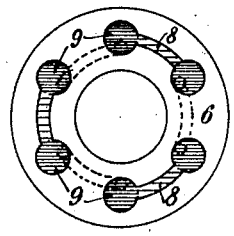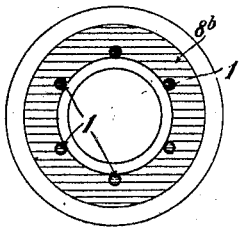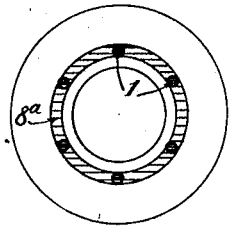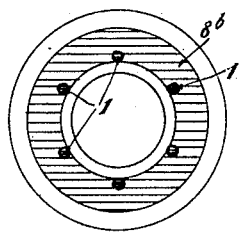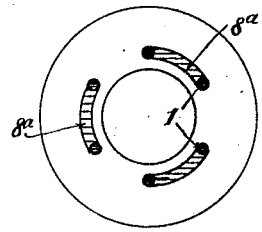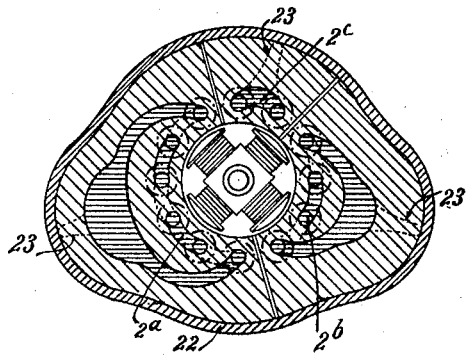

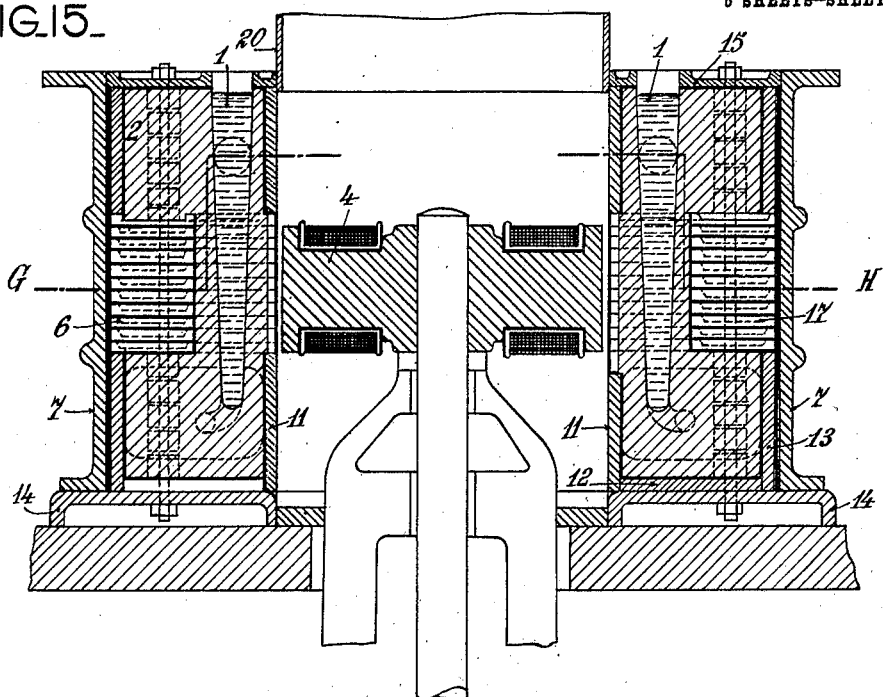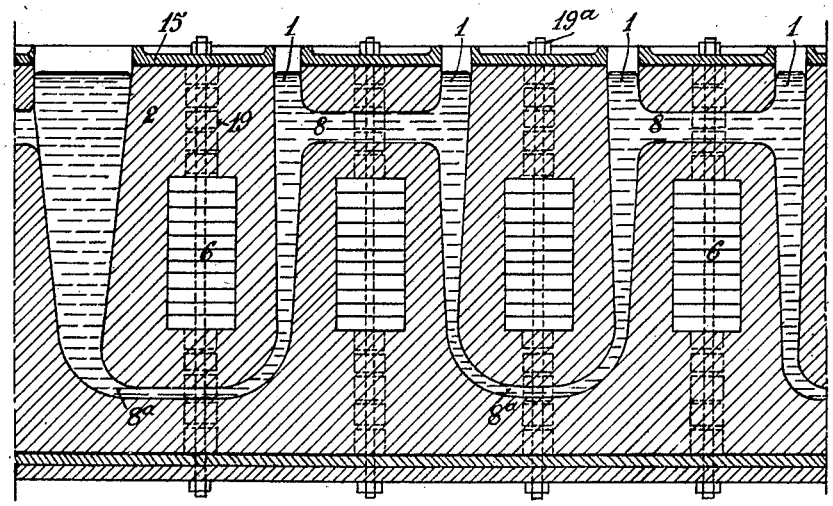

J. BALLY.
ELECTRIC FURNACE.
APPLICATION FILED JULY 5, 1912.
1,068,558.
Patented July 29, 1913.
5 SHEETS—SHEET 4.
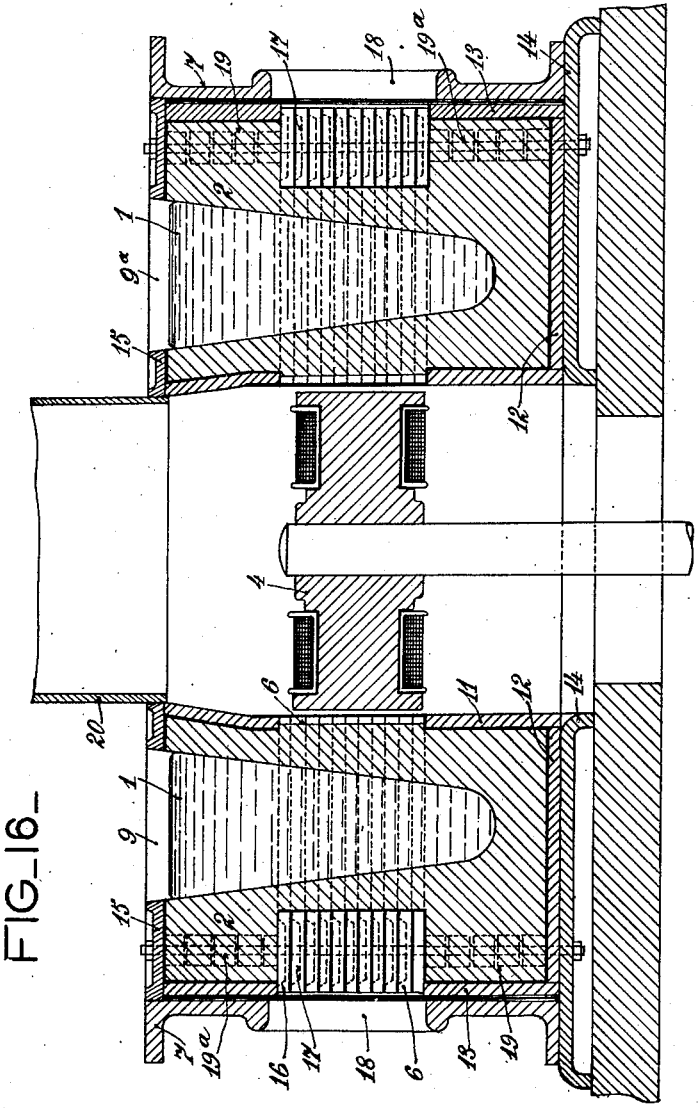
WITNESSES:
John C. Sanders
Albert F. Heuman
INVENTOR:
Jean Bally
BY Wallace White
ATTY.

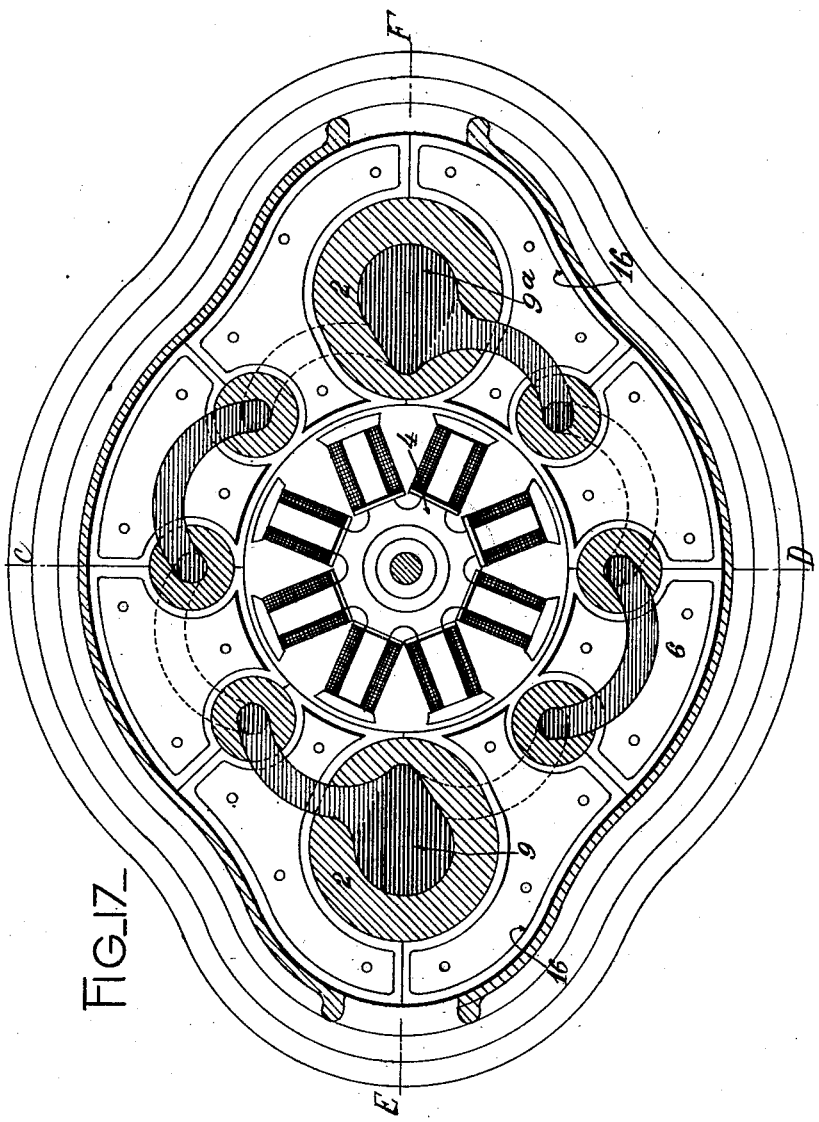

UNITED STATES PATENT OFFICE.

JEAN BALLY, OF GRENOBLE, FRANCE.

ELECTRIC FURNACE.

1,068,558.   Specification of Letters Patent.   Patented July 29, 1913.

Application filed July 5, 1912. Serial No. 707,854.

*To all whom it may concern:*

Be it known that I, JEAN BALLY, citizen of the Republic of France, residing at 4 Rue de la Fédération, Grenoble, Isère, in the Republic of France, have invented new and useful Improvements in Electric Furnaces, of which the following is a specification.

This invention relates to an electric induction furnace of the type wherein the available energy is directly transformed into induced currents in the furnace by means of a stationary armature formed by the metal or other conducting material contained in the furnace and a field magnet or inductor. One characteristic feature of the invention is that the conduits containing the material to be heated are so arranged that the axis or center lines of said conduits are all on a cylindrical surface, the stationary or rotating inductor being located inside of said surface. The stationary armature may thus be formed by shafts arranged in parallelism with the inductor axis and located in the slots of a magnetic frame, said shafts being connected together by conduits or plates so as to form a single phase or multiphase structure; the armature coils which are each formed by two shafts are connected in series, in multiple or in multiple series and are located upon one or more cylindrical surfaces having the same axis as the inductor system. This electrical furnace has important advantages which will be pointed out thereafter.

Figure 1:
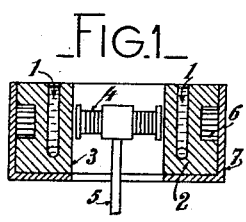
Figure 2:
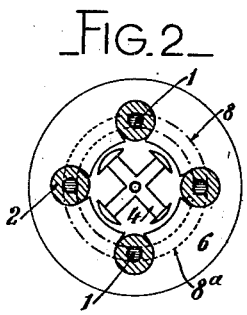
Figure 3:
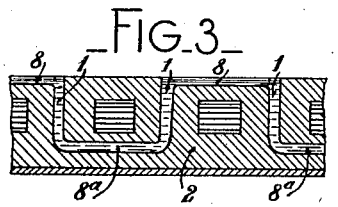
Figure 4:
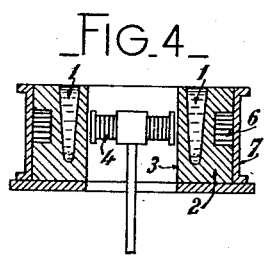
Figure 5:
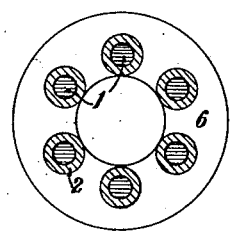
Figure 6:
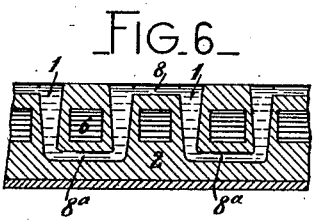
Figure 8:
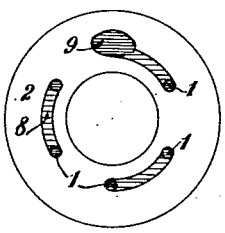
Figure 7:
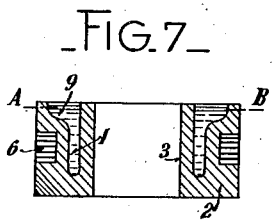
Figure 9:
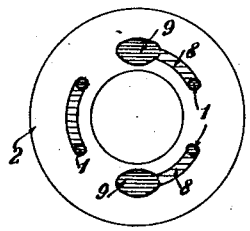

In the annexed drawings: Figures 1 to 3 show diagrammatically in vertical section, horizontal section and unfolded view, respectively, an electric furnace constructed in accordance with the invention, the movable inner inductor having four poles. Figs. 4 to 6 are corresponding views of a furnace with six poles, the shafts having gradually varying cross sections. Fig. 7 is a vertical section through the axis of a furnace in which the shafts are provided at their upper end with enlargements or working chambers. Figs. 8, 9 and 10 are horizontal sections along the line A—B in Fig. 7 showing different types of furnaces with working chambers. Fig. 11 is a horizontal section similar to Figs. 8, 9 and 10, showing a furnace provided with an annular working chamber and having its armature in the form of a squirrel cage winding. Fig. 12 is a corresponding horizontal section on the level of the lower part of the shafts. Figs. 13, 14 are views similar to Figs. 11, 12, of an electric furnace with an uninterrupted working chamber, the shafts being arranged by pairs. Fig. 15 is an enlarged vertical section along C—D, Fig. 17, of a single phase furnace wherein the inductor and armature have each eight poles. Fig. 16 is a vertical section of said furnace along the line E—F, Fig. 17. Fig. 17 is a horizontal section thereof along the line G—H, Fig. 15. Fig. 18 shows a vertical section thereof unfolded in a plane. Fig. 19 is a horizontal section of a twelve poles furnace for three metals, with three circuits of different capacities, the furnace being formed by three parts capable of being tipped separately for casting.

The electric furnace shown in Figs. 1 and 2 comprises a number of vertical shafts 1 formed in a body 2 of fire-proof material. The shafts 1 are designed to contain the metal, ore or other conducting material to be melted or treated which forms the armature or stator. Said shafts 1 are located around a central circular space 3 in which an inductor 4 rotates. The inductor 4 is keyed on a shaft 5 which is parallel to the shaft and is actuated by any suitable source of motive power. The magnetic frame of the armature is formed by metal sheets 6 arranged one upon the other and cut away to receive the shafts 1 which are thus located as in the slots of the magnetic frame in an alternator. The whole of the shafts 1 and the magnetic frame 6 may be surrounded by a casing 7.

The inductor is excited in any suitable manner. In the construction shown in Figs. 1 and 2, the inductor or rotor has four poles and the shafts 1 which form the poles of the armature or stator are also four in number. The shafts 1 are in communication together in series so as to form an uninterrupted electric circuit. As shown in Fig. 3, they are connected together alternately at their upper part by means of a channel 8 formed in the upper surface of the refractory body and at their lower part by a conduit 8ª formed in the interior of said body. The shafts may also be connected in multiple or in parallel or in parallel series as hereinafter explained instead of being in series.

Instead of being of a cylindrical shape and having a cross section of uniform size throughout their length as in Figs. 1 to 3, the shafts may have a cross section, the size of which gradually increases toward the top (Figs. 4 to 6) or they may be provided at the top with an enlarged part 9 (Fig. 7), called working chamber which permits of handling more easily the material to be treated, while leaving to the shafts a small cross section on the greater part of their length, which is desirable for heating purposes. A furnace having for instance six shafts may be provided with a single working chamber 9 or two working chambers (Fig. 9) or as many working chambers as there are shafts (Fig. 10), the connecting channels 8 provided at the upper end of the furnace running into said chambers.

According to Fig. 11, the separate working chambers above described are replaced by a circular channel $8^b$ forming an uninterrupted working chamber. In this case, all the lower ends of the shafts may be connected together as shown in Fig. 12, which affords the arrangement called squirrel cage winding which may be used either for single phase of multiphase current. According to Figs. 13 and 14, the furnace is also provided with a continuous working chamber $8^b$ but the lower connections $8^a$ are arranged in such a manner that the shafts are distributed into coils each formed of two shafts and connected together in parallel.

If the furnace is intended to work as a three phase furnace, the twelve shafts are distributed into three distinct phases arranged at suitable angles one to the other. The phases may be connected together provided that each of them forms an independent closed circuit. The connection may be obtained through a common working chamber. The upper connecting conduit could be superposed or arranged at various levels instead of being on the same plane as shown. The same remark applies to the lower connections.

The inductor system 4 could be formed if desired by a number of superposed inductors, as well as the magnetic frame. Two or more shafts could also be arranged on the same radial line of the furnace, said shafts belonging to different concentric circuits and being therefore under the influence of derivations of the magnetic flux.

The furnace shown in detail in Figs. 15 to 18, is a single phase furnace with eight poles and two working chambers. The inductor 4 may be directly coupled to any suitable engine or actuated otherwise. The refractory body 2 in which the shafts are formed is contained at the bottom in annular pieces 11, 12, 13, carried by a base 14 which is itself supported by any suitable foundation and may be provided with any appropriate device for centering the furnace around the inductor axis. A metallic shell 7 is arranged around the furnace which is closed at the top by a cover 15 provided with holes corresponding to the shafts. For closing the shafts when desired, or in view of avoiding any loss of heat by radiation, blocks or plugs lined with refractory material may be used. All shafts 1 are connected in series (Fig. 18), the upper connections 8 and lower connections $8^a$ being formed by conduits provided in the refractory body. Two of the shafts 1, located at diametrically opposite points and having an enlarged cross section, form the working chambers 9, $9^a$. The furnace is extended laterally at these points (Fig. 17) so that an easier access may be had to said working chambers.

The magnetic frame of the armature is formed by superposed metal sheets or plates 6. For facilitating the erection and preventing ruptures by expansion under the action of heat, said plates may be divided as shown into sectors of suitable shape which are in contact together by their edge. Each of the sectors has on its edges a bead or ridge 16 so as to leave between the superposed plates hollow spaces 17 (Figs. 15, 16) in which a fluid may be caused to circulate for cooling the armature in its thick parts when it is not desired to utilize to its full extent in the refractory body the heat produced by hysteresis in the magnetic frame of the armature. In the case of an air circulation the same is created by the rotation of the inductor 4 and a fan not shown keyed on its shaft. The outer shell 7 is provided with holes 18 which may be closed by dampers, said holes permitting the air which has entered the spaces 17 in the interior of the furnace to escape outwardly.

The plates or sheets 6 of the magnetic frame are carried in the construction shown by sleeves or tubes 19 mounted on bolts $19^a$ which are fixed at the top in the cover 15 of the furnace. By this arrangement, all the metal parts of the furnace may be erected before the refractory material is put into place. In the formation of the shafts and conduits in the refractory body, a metal core may be used which may act as a conductor for the preliminary heating of the furnace and is melted thereafter.

20 is a central exhaust pipe which extends above the furnace for the purpose of preventing the movable part of the furnace from injury and leading upward the main part of the air current produced by the fan, which air current serves to cool the magnetic frame and also the inductor, the latter being also cooled by its rotation in the air. The exhaust pipe 20 is preferably made in two parts so that the lower part may be raised for facilitating the raising and tipping of the furnace. One of the shafts may be provided with a pouring nozzle and the whole of the armature may be carried by three or more hydraulic pistons which allow of first raising the armature to clear the inductor structure and then tipping said armature.

It will be noted that the upper connections between the shafts are located at a certain distance beneath the upper ends of the shafts whereby a large amount of metal may be poured without getting the furnace out of operation by breaking the electric circuit.

The type of electric furnace above described has special advantages when used for melting or preparing alloys. In this case the shafts and conduits are arranged so as to form separate coils or circuits which may contain different metals or alloys.

For the purpose of making easier the management of the furnace, the same may be divided into a number of sections $2^a$ $2^b$ $2^c$ (Fig. 19) corresponding to that of the different metals or alloys, the sections being held together in the operation by bands, 22. The joints between the sections have no influence upon the magnetic circuits as it will be readily understood. Each section is then provided with a pouring nozzle 23 so that for emptying the section of the furnace which contains the desired metal or alloy, the bands 22 may be disconnected and said section tipped in a known manner. In this case, it is not necessary to raise first the furnace above the inductor as in furnaces in one piece.

The new electric furnace above described either with stationary or rotating inductor has over the electric furnaces already known the following advantages:

1. The capacity of the furnace may be arranged in various ways and a great number of different combinations may be realized for instance in combining in the same furnace several systems with different shafts provided or not with working chambers, in series, in parallel or in series parallel, in single phase or multiphase systems, and located in one or more concentric circles, according to the conditions to be met, whereby the furnace may be rendered suitable for industrial applications of all kinds.

2. The refractory lining of the furnace is in very good conditions of resistance, the parts exposed to the air being reduced to the minimum by the arrangement of the shafts, and the whole being rigidly secured together by the magnetic frame itself.

3. The heating and melting operations are effected in the best conditions for resisting to the electric phenomena of contraction which can occur in the parts of the circuits having small cross sections. In the furnace according to the invention, instead of avoiding said strangulated portions, the same may be used with advantage in the lower parts of the shafts and in the lower connecting conduits either in arranging a portion of reduced cross section or in giving to the shafts a cross section decreasing gradually toward the bottom. This arrangement is not objectionable because of the pressure of the metal body which is opposed to the phenomena of contraction. The described arrangement has also the important advantage of facilitating the natural stirring of the melted mass in view of rendering the metal more homogeneous, by the rising of the heated parts in the metal mass in the shafts and the sinking of the cooler parts and the charges or additional materials poured into the shafts.

4. The losses of heat by radiation are considerably reduced, the area of the bath exposed to the air being restricted to the upper ends of the shafts, which may be closed easily by means of plugs.

5. The ohmic resistance may be easily increased and the self induction reduced accordingly in view of increasing the power coefficient. Moreover the melting of highly conductive metals, can be effected more easily than in the known induction furnaces of the transformer type with a horizontal channel in view of the greater length which may be easily given to the circuit in a furnace according to the invention having the same diameter by means of the several shafts.

Having now described my invention, what I claim as new and desire to secure by Letters Patent is:

1. In an electric furnace: a stationary armature comprising channels connected together which contain the material to be heated and are arranged around a central space and an inductor located in said central space, said inductor being formed of a number of polar pieces so arranged that the axis thereof extend radially from the axis of the furnace, substantially as described and for the purpose set forth.

2. In an electric furnace: a stationary armature comprising substantially horizontal and vertical channels which contain the material to be heated and are arranged around a central space and an inductor located in said central space, said inductor being formed of a number of polar pieces so arranged that the axis thereof extend radially from the axis of the furnace, substantially as described and for the purpose set forth.

3. In an electric furnace: an annular stationary armature comprising channels which contain the material to be heated and are arranged around a central space, an inductor rotating in said central space, said inductor being formed of a number of polar pieces so arranged that the axis thereof extend radially from the axis of the furnace, and means for rotating and exciting the inductor, substantially as described and for the purpose set forth.

4. In an electric furnace, in combination: an annular stationary body, devices in said body for containing the material to be heated, said devices being parallel with the axis of the annular body, means for connecting said devices together, a magnetic frame around said devices, an inductor rotating inside the annular body and means for rotating and exciting the inductor, substantially as described and for the purpose set forth.

5. In an electric furnace, in combination: an annular stationary body made of refractory material, shafts in said body containing the material to be heated said shafts being parallel with the axis of the annular body, and having a gradually decreasing cross section from the top to the bottom, working chambers at the top of said shafts, conduits in the annular body connecting said shafts together, a magnetic frame around the shafts, means for supporting said magnetic frame independently of the refractory body, an inductor rotating inside the annular body and means for rotating and exciting the inductor, substantially as described and for the purpose set forth.

6. In an electric furnace, in combination, an annular stationary body made of refractory material, shafts in said body containing the material to be heated, said shafts being parallel with the axis of the annular body, and having a gradually decreasing cross section from the top to the bottom, working chambers at the top of said shafts, conduits in the annular body connecting said shafts together, a magnetic frame around the shafts means for supporting said magnetic frame independently of the refractory body, holes in said magnetic frame, means for causing a cooling fluid to circulate in said holes, an exhaust pipe above the central space in the annular body, plugs for closing the shafts at the top, an inductor rotating inside the annular body and means for rotating and exciting the inductor, substantially as described and for the purpose set forth.

7. In an electric furnace, in combination: an annular stationary body made of refractory material, shafts in said body containing the material to be heated, annular conduits in the annular body connecting the shafts together at the top and at the bottom, respectively, a magnetic frame around the shafts, an inductor rotating inside the annular body and means for rotating and exciting the inductor, substantially as described and for the purpose set forth.

8. In an electric furnace in combination: an annular stationary body made of a plurality of sections, removable means for retaining said sections together, shafts in said sections, an inductor rotating inside the annular body and means for rotating and exciting the inductor, substantially as described and for the purpose set forth.

In testimony whereof I have signed my name to this specification in the presence of two subscribing witnesses.

JEAN BALLY.

Witnesses:
  LOUIS MOSES,
  LUCIEN MEMMINGER.